United States Patent
Petersen

(10) Patent No.: US 11,535,531 B2
(45) Date of Patent: Dec. 27, 2022

(54) REDUCED LATERAL LEAKAGE IN REVERSE OSMOSIS DEVICES

(71) Applicant: Robert J. Petersen, Minneapolis, MN (US)

(72) Inventor: Robert J. Petersen, Minneapolis, MN (US)

(73) Assignee: NL Chemical Technology, Inc., Mount Pleasant, IL (US)

( * ) Notice: Subject to any disclaimer, the term of this patent is extended or adjusted under 35 U.S.C. 154(b) by 120 days.

(21) Appl. No.: 16/947,527

(22) Filed: Aug. 5, 2020

(65) Prior Publication Data

US 2022/0041474 A1    Feb. 10, 2022

(51) Int. Cl.
*C02F 1/44*        (2006.01)
*C02F 103/08*     (2006.01)

(52) U.S. Cl.
CPC .......... *C02F 1/441* (2013.01); *C02F 2103/08* (2013.01); *C02F 2301/026* (2013.01)

(58) Field of Classification Search
CPC . C02F 1/441; C02F 2103/08; C02F 2301/026
See application file for complete search history.

(56) References Cited

U.S. PATENT DOCUMENTS

| | | | |
|---|---|---|---|
| 3,417,870 A | 12/1968 | Bray | |
| 4,235,723 A | 11/1980 | Bartlett, Jr. | |
| 4,842,736 A | 6/1989 | Bray | |
| 5,096,584 A | 3/1992 | Reddy et al. | |
| 5,114,582 A | 5/1992 | Sandstrom et al. | |
| 5,147,541 A | 9/1992 | McDermott et al. | |
| 5,538,642 A | 7/1996 | Dolie | |
| 5,681,467 A | 10/1997 | Solie | |
| 6,881,336 B2 | 4/2005 | Johnson | |
| 2008/0295951 A1 | 12/2008 | Hiro et al. | |
| 2015/0321148 A1* | 11/2015 | Hirozawa | B01D 69/10 210/500.21 |
| 2016/0303514 A1* | 10/2016 | Tabayashi | B01D 63/103 |

* cited by examiner

*Primary Examiner* — Waqaas Ali
(74) *Attorney, Agent, or Firm* — Robert J. Petersen

(57) ABSTRACT

Spiral wound reverse osmosis devices with reduced lateral leakage and thereby increased salt rejection are made by compacting a microporous layer within a composite reverse osmosis membrane longitudinally along its lengthwise periphery. Means and method for causing longitudinal indentations in composite membranes during manufacturing operations are disclosed and described.

6 Claims, 5 Drawing Sheets

REDUCED LATERAL LEAKAGE IN REVERSE OSMOSIS DEVICES

FIELD OF THE INVENTION

This invention relates to the design of reverse osmosis spiral wound devices, and more particularly to improved spiral wound devices with reduced or eliminated side seal leakage.

BACKGROUND OF THE INVENTION

Reverse osmosis developed into an economically feasible process approximately in the late 1960's. This industry centered on this process has matured in recent years, with almost all reverse osmosis installations utilizing spirally wound membrane devices. It finds wide application in production of purified water for industrial uses, improved water quality for drinking water from brackish water sources, and potable water from seawater. Of these, the most technically demanding application is the desalination of seawater to provide drinking water. Seawater desalination requires membranes with very high separation properties, essentially flawless modules containing the membranes, and high operating pressures. Reverse osmosis membranes capable of desalting seawater generally consist of a nonwoven polyester web carrier coated with a thin layer of a microporous plastic (polysulfone or polyethersulfone) upon which an ultrathin layer of an aromatic polyamide is present.

Seawater in most areas of the world contains approximately 35,000 parts per million (ppm) of dissolved salts, equivalent osmotically to a sodium chloride concentration of 32,000 ppm. A reverse osmosis membrane having a salt rejection coefficient of 99% would nominally produce a permeate of 350 ppm. But this does not take into consideration that the incoming seawater is being concentrated to an outflow salinity of typically around five percent (50,000 ppm), and that a phenomenon of concentration polarization at the surface of a membrane is operative. Furthermore, no spiral wound membrane device is totally free of defects. Any defects will pass raw feed water at a concentration of 35,000 ppm or higher. Because of the contrast in salinity, i.e. seawater feed salinity versus permeate salinity, even small leaks will noticeably degrade permeate water quality. Accordingly, reverse osmosis membranes with greater than 99% rejection are necessitated, and efforts are continually made to fabricate defect-free spiral wound devices.

Spiral wound reverse osmosis devices are constructed so as to have a plurality of leaves, each leaf normally consisting of a membrane-spacer-membrane sandwich. Feed water channel spacers are positioned between adjacent leaves. The spacer in this sandwich drains permeate water from the backs of the membranes, conducting the permeate to a perforated core tube. These leaves are each held together on the two parallel sides and at the end distant from the core, a glue being used to bond and seal the three sides of the membrane envelope. The fourth side of a membrane envelope feeds into a permeate collector tube at the core. Two-part urethane adhesives are typically the glue of choice. A standard 8-inch-diameter spiral wound module typically contains 30 or more such leaves.

In the fabrication of a reverse osmosis spiral wound device by manual techniques, membrane is cut to length and folded on itself with the salt rejecting surface facing inward. A feed channel spacer is inserted into this fold. This assembly is then placed upon a pre-cut length of permeate channel spacer. Then a longitudinal bead of glue is deposited on the membrane backside, running along the side edge of the membrane, and extended across the tail end, and continued along the opposite (parallel) edge of the membrane backside. A new sheet of the permeate spacer is laid the top of this assembly. The procedure is repeated, building up a stack of material comprising permeate spacer, membrane, feed spacer, membrane, etc. Eventually, the stack is wound upon a perforated, water-collection tube, wherein ends of the permeate channel spacers are in contact with the perforated tube at the core. This is schematically illustrated, for instance, in US Publ. Pat. Appl. 2008/0295951, which is herein incorporated by reference in its entirety. Mechanization of the fabrication process as by automation may involve changes or alterations in the above sequence.

The urethane adhesive is preferably thixotropic so as not to move about freely during the membrane stack layering procedure. During the winding step, a portion of the adhesive resting on the back of one membrane fold is forced through the permeate channel spacer and into contact with the back of an adjacent fold of membrane. The adhesive is desired to penetrate the nonwoven support web of each of the two adjacent folds, bonding them together along with the permeate channel spacer. Additionally, interaction of the isocyanate component of the adhesive with the microporous coating on the web is desirable, leading to fusion and sealing off the microporous layer.

Difficulties can arise when the mixing ratio of the two-part urethane is not optimum, or when moisture is present in the fabrics or in humid air conditions thereby causing bubbling in the cured polyurethane, or when the curing process of first-laid polyurethane has advanced too far before the spiral winding takes place. In regard to the latter, construction of a 30-leaf spiral device involving up to a minute's time per layout of each leaf will result in the first laid adhesive bead advancing in cure for up to 30 minutes, while the last laid bead is freshly mixed. This variation can negatively affect the competency of the final bond in some portions of the spiral wound leaf edges. In the case of seawater desalination, the glue bond must withstand a pressure gradient, outside-to-inside, of 800 psi. This fluid pressure does not pull the glued edge bonds apart, since external pressure on the glue bond zone exists equal to the pressure against the membrane edge. But the pressure difference between the feed water outside a membrane leaf and the permeate stream inside the membrane leaf does try to drive infiltration of the seawater into the glue bond through any weak points, often leading infiltration tracks all the way through the glued zone into the permeate channel.

US Publ. Pat. Appl. 2008/0295951, referred to above, highlights the problem of lateral microleaks through the microporous coating layer of a composite reverse osmosis membrane device due to incomplete penetration of the adhesive through all the layers of the composite reverse osmosis membrane. This reference documented the presence of such microleakage and disclosed parameters for web porosity that would ameliorate this problem. This same microleakage has been observed by the present inventor in concentrated dye tests. This observation has led to a quite different approach, as will be disclosed herein, that also solves the problem of lateral microleakage through the microporous plastic layer that sits right underneath the ultrathin salt-rejecting layer of composite reverse osmosis membrane, the microporous plastic layer being a site of lateral leakage during in seawater desalination.

It is an object of this invention, therefore, to eliminate most or all lateral migration of raw feed water such as seawater through the microporous plastic layer of composite reverse osmosis membranes in spiral devices.

It is a further object of this invention to provide a simple and elegant approach that is adaptable to a continuous membrane manufacturing operation which, when applied, enables elimination of most or all lateral migration of raw feed water through side glue bonds in subsequently fabricated spiral wound devices.

SUMMARY OF THE INVENTION

It has now been found and is herein disclosed that a longitudinal indentation in the composite reverse osmosis membrane along each side of the membrane leaf in the machine direction of the composite membrane, acting in combination with a polyurethane bonding adhesive, suffices to eliminate most or all of the lateral movement of raw feed water through the microporous coating layer. This indentation corresponds to a compaction of the microporous coating such that the porous structure of the microporous plastic is compressed to a state of being essentially nonporous. The longitudinal indentation is positioned at a point set in from the trimmed edge of a spiral wound device but well within the zone of the glue bond. The depth of the indentation is derived by the compaction of the microporous layer, but not to any significant degree by compaction or distortion of the underlying nonwoven web support, nor in any significant degree by compaction of the permeate channel spacer.

This disclosure not only sets forth the utility of a longitudinally indented surface along the sides of a composite reverse osmosis membrane, but also presents a method of generating indented membranes in a commercially feasible processing method. Thus, the use of embossing rollers in a manufacturing process is herein disclosed and described.

LIST OF FIGURES

DESCRIPTION OF THE INVENTION

A method by which reverse osmosis membranes suitable for application in seawater desalination are made involves generally the following basic steps. A nonwoven web is coated with a solution of an engineering plastic (commonly polysulfone) dissolved in a water-miscible solvent. The coated web is passed through a water bath, which extracts the solvent and precipitates the plastic under conditions that generate a porous coating of the plastic. The coated web is impregnated with an aqueous solution containing an aromatic amine having on average at least two amino groups. Excess solution is removed as by a nip roller or an air knife or other suitable means. The impregnated web is then contacted with a nonaqueous solution containing preferably one or more aromatic acyl halides, having on average 2.2 to 3.0 acyl halide groups per aromatic ring. An aromatic polyamide forms at the interface between the aqueous and nonaqueous phases. The polyamide-coated web is subsequently passed through a drying oven.

Variations will likely exist among different manufacturers of seawater reverse osmosis membranes, but these basic steps are present among the various processes. For instance, the composite membrane may be washed in water baths. It may be impregnated with glycerol for flux enhancement. It may be coated with a polyvinyl alcohol layer for abrasion resistance.

Membrane fabricated by this general process comes off a manufacturing line as a roll on a core, much like one would wind up a roll of paper. Lengths of membrane would be cut from this roll, folded, receiving an insert of a feed water channel spacer, and the folded sub-assembly stacked upon a sheet of permeate channel spacer. Glue would be deposited. A multiple layer of these materials would be eventually wound up on a perforated water collection core tube. In automated equipment for producing spiral devices, this arrangement may be different, though the result is still an assembly of three-sided membrane leaves bonded by glued edges. After sufficient time for the glue to set and cure, the spiral wound device would be trimmed at or adjacent each end of the core tube, exposing the glue-sealed edges of the membrane leaves. Typically, the manufactured membrane web has a width of 40 inches, and the trimmed spiral devices are trimmed to a width of 38 to 39 inches, and the glue bonded zone extends inward from the trimmed edge by perhaps half an inch or more. The trimming removes selvage and excess glue extruded in the winding step.

In the case of the present invention herein disclosed, a longitudinal indentation is to be positioned in the membrane running along each edge of the membrane in the manufactured membrane roll, such that in the subsequent spiral winding, gluing, and trimming operations, the longitudinal indentations are located and remain extant within the cured glue zone that extends from the trimmed edges.

Figure 1:
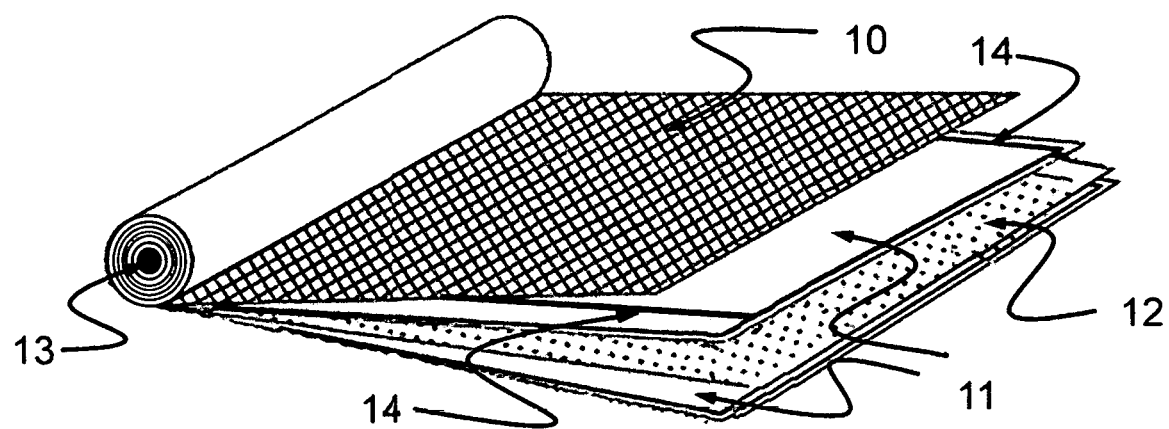
FIG. 1 is a schematic drawing features of a spiral wound device design.

Turning now to FIG. 1, an assembly is shown of layers to be built into a spiral wound reverse osmosis device, this depiction showing a single membrane leaf design. The layers shown in FIG. 1 include a feed water channel spacer 10, two layers of a reverse osmosis membrane 11, a permeate channel spacer 12, all to be wound upon a perforated water collection tube 13. Also indicated are the placement of glue beads 14 along the two sides of the membrane leaf and across the width of the outer, external ends of the membrane leaf.

Figure 2:
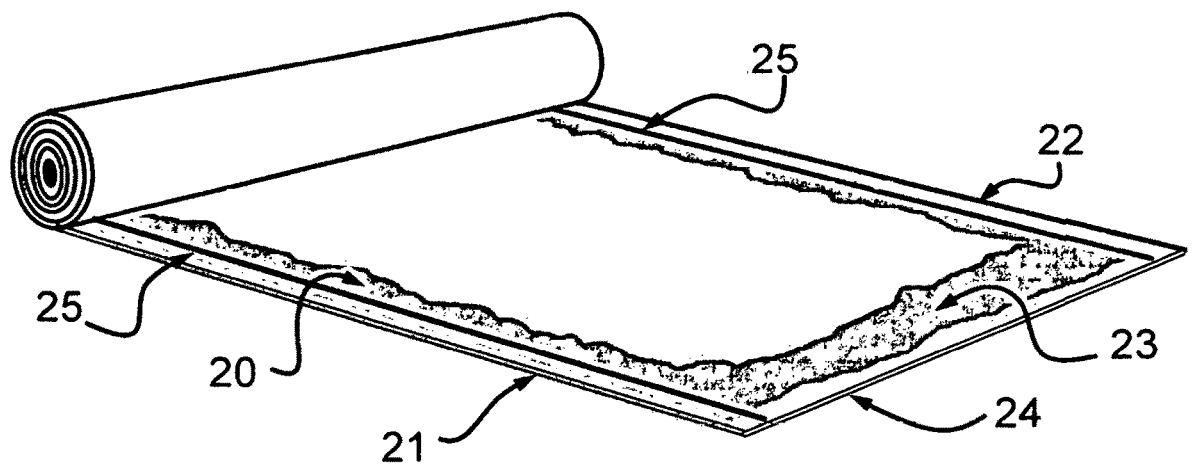
FIG. 2 is a schematic showing location of longitudinal indentations in a section of a composite membrane.

FIG. 2 is provided to show the presence and positioning of the longitudinal indentations in a membrane leaf. In FIG. 2, a top view of a glued membrane leaf section shows a zone of glue bond 20 extending inward from a trimmed edge 21 on the two edges 22 and also an end seal 23 glue bond at the leaf end 24. The longitudinal indentations 25 are shown running along the trimmed edges 21 but set in from the trimmed edges while remaining within the glued zone 20.

Figure 3:
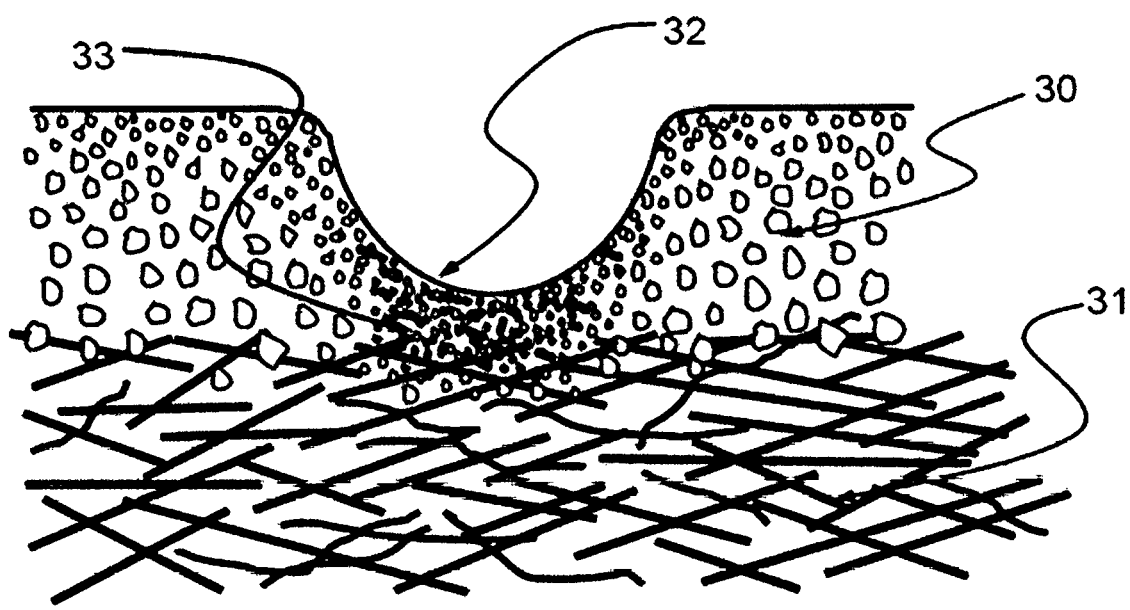
FIG. 3 shows a magnified cross-sectional view of composite membrane with indentations.

FIG. 3 shows a cross-section of a reverse osmosis membrane having the indentation. A microporous layer 30 of an engineering plastic such as polysulfone is present as a layer on a porous nonwoven web 31. An indentation 32, seen in cross-sectional view, is present in the microporous layer 30, and dips down toward but not necessarily all the way to the nonwoven web matrix. The bottom of the trough indicated in this depiction of the indentation is in contact with a compacted zone 33 of the otherwise microporous plastic 30. The shape of the indentation may be varied and need not be exactly according to this depiction.

Figure 4:
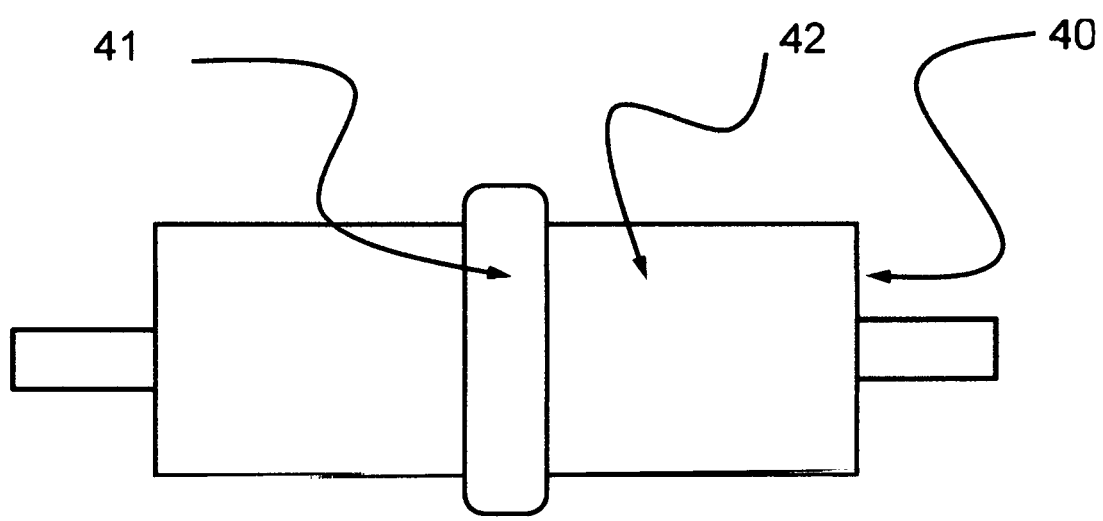
FIG. 4 is a frontal view of a device for forming a longitudinal indentation.
Figure 5:
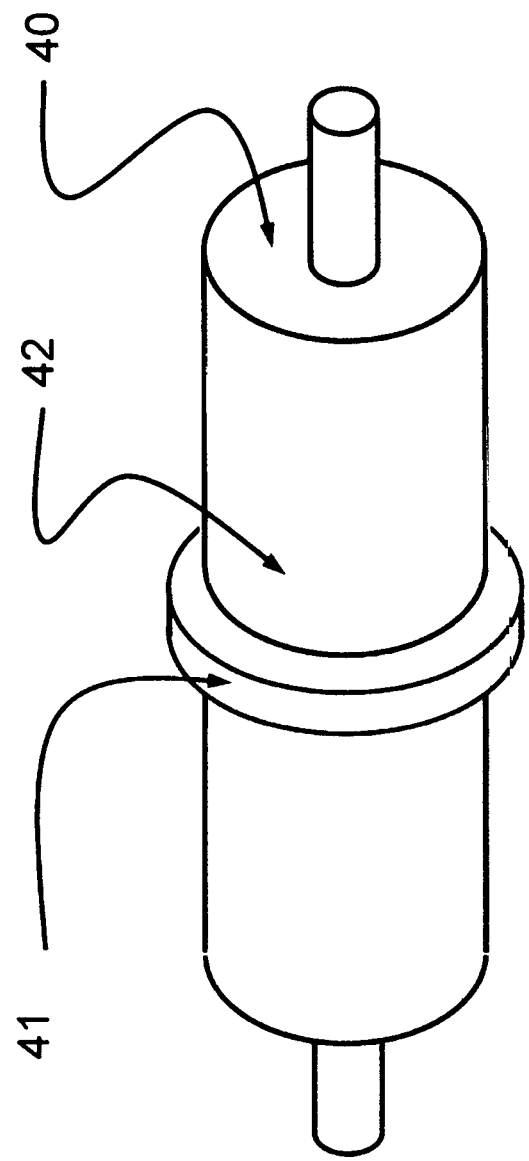
FIG. 5 is a view from an angle of the device for forming a longitudinal indentation.

FIG. 4 shows a frontal view of a design of an indenting device that may be employed to generate the longitudinal indentation. The indenting device of this figure comprises a wide disk 40 having a raised ridge 41 running around the circumference of the disk 40. The ridge 41 is preferably located at a midpoint on the face 42 of the disk. The disk 40 is to be designed to be mounted on a shaft and ride on the surface of a web, whereupon the raised ridge 41 embosses the web on which the disk rides. FIG. 5 is a view of the same disk taken from an angular perspective. A pair of such disks are meant to be used, one along each side of a membrane web being produced in a membrane manufacturing line, the raised ridges being set in appropriately from the edge of the web, thus positioning longitudinal indentations that will eventually exist in a subsequent cured glue zone of a spiral wound device after trimming. In normal manufacturing practice, of course, a continuous web has a first and a second edge located lengthwise in the machine direction, the two edges running generally in parallel, and the embossing lines are preferably adjacent the edges of the web. A suitable alternative is a single disk or cylinder having a length extending the full width of the web to be embossed and having raised ridges at or near each end of the disk or cylinder by which simultaneous embossing along each edge of the coated web may be attained. Pressure is preferably applied to the disks by means of springs, air cylinders, dead weights, or the like, so that as the disks ride on a coated web surface, the ridges forcibly indent the microporous layer upon which they ride in contact. The embossing disks preferably rotate freely when in contact with the coated web. This may entail the disk rotating on the mounting shaft, or the mounting shaft itself rotating.

The height of the ridge is preferably equal to the thickness of the microporous layer being generated on a nonwoven web. The shape of the ridge is preferably radius-ed so as have rounded rather than sharp corners. This avoids generating cuts in the microporous layer. It also eliminates collecting debris in sharp recessed corners. The primary action of the raised ridge is to be a compressing of the microporous structure, creating an indentation backed by compacted material of the microporous plastic. A narrow disk may be used instead, where the disk itself is no wider than the raised ridge of FIG. 4, the whole face of the disk being the embossing means. However, better control of embossing pressure is at hand through a wide face as depicted in FIG. 4. The face width is preferably less than twelve inches, more preferably less than six inches, most preferably four inches or less. The width of the raised ridge is preferably less one-fourth inch, more preferably one-eighth inch, measured as its base on the face of the disk. The top of the raised ridge preferably produces an indentation that is preferably about one-sixteenth of an inch wide at its widest, but acceptable as an indentation at a width of one-thirty-second at its widest.

The embossing disks can be employed at almost any step in the manufacturing of a continuous membrane web. However, the optimum location for embossing of the microporous layer is early in a membrane processing machine, preferably in the unit operation where the microporous layer is formed on its nonwoven web support. Thus, where the nonwoven web is coated with a solution of an engineering plastic dissolved in a water-miscible solvent and in passed into contact with water, precipitation of the engineering plastic occurs in the form of a microporous coating. Embossing of the freshly formed microporous layer is most permanent when that layer is still rich in solvent. Location of the pair of embossing disks is conveniently in the machine where the web having the freshly generated microporous layer as a coating passes over a roller, the nonwoven web in contact with the roller and the microporous layer facing outward. The embossing operation may take place submerged in the aqueous bath or at a place where the web emerges either temporarily or permanently from the aqueous bath.

Embossing the membrane, while preferably performed early in the membrane manufacturing process, can be performed at other places in a membrane production facility. Embossing may be done following formation of the aromatic polyamide discriminating layer by interfacial reaction, but before the newly formed membrane enters a drying oven. Alternatively, embossing may be performed at the membrane's exit from a drying oven. Or embossing may be performed after the membrane is coated with an abrasion resistant top layer of polyvinyl alcohol at the end of a membrane production line. Greater embossing force may be anticipated to be required at these later stages in a membrane production line.

A single longitudinal indentation near each edge of a spirally wound and trimmed membrane device is sufficient to interrupt the lateral micro-leakage of raw feed water through the microporous layer in the region of the glued zone. However, it is feasible to employ embossing disks having two or more raised ridges, thus providing groupings of two or more longitudinal indentations in the microporous layer in the region of the glued zone.

Alternate embossing means may be employed other than the disks depicted in FIG. 4. One alternate design would be a full width roller, i.e. a roller whose face extends across the full width of the traveling membrane web, this full width roller having formed on it a raised ridge appropriately positioned near each end. This alternatively designed roller would ride upon the traveling face of the membrane web, with embossing occurring at the contact zones of the raised ridges. The raised ridges could be created on the full width roller by various means, including welding strips around the circumference of the roller, braising or soldering pre-formed collars onto the roller, and even by 3-D printing of raised metallic ribs on the roller circumference. One may even cut O-ring grooves in the surface of the roller and insert O-rings of hard rubber compositions into these O-ring grooves. Any one of these methods may be used as well to engineer the disks depicted in FIG. 4. These and other alternative methods of generating the raised ridges are well within the art of mechanical engineering and may be optimized according to a manufacturer's particular process line, web choice, and formulations of the microporous plastic layer and the polyamide recipe.

The invention claimed is:

1. A reverse osmosis membrane suitable for seawater desalination comprising a length of a nonwoven web coated with a microporous layer of a plastic upon which a semipermeable salt rejecting discriminating layer is deposited, the membrane characterized by having at least one longitudinally indented surface strip along an edge of the membrane, the indented surface being in contact with and corresponding to a compacted strip of the microporous plastic coating.

2. The membrane of claim 1 wherein a pair of longitudinally indented surfaces are positioned in parallel, one adjacent to each edge of the membrane along its length.

3. The membrane of claim 1 wherein the longitudinally indented surface is formed by contact of the membrane with an embossing roller.

4. The membrane of claim 3 wherein the contact with the embossing roller takes place in a manufacturing step wherein the microporous layer of the plastic is coated on the nonwoven web.

5. The membrane of claim 3 wherein the embossing roller has at least one raised ridge around its circumference, the raised ridge causing the indented surface.

6. The membrane of claim 5 wherein the embossing roller has at least two raised ridges, at least one each embossing an indented surface strip adjacent each edge of the membrane along its length.

* * * * *